United States Patent Office 3,328,498
Patented June 27, 1967

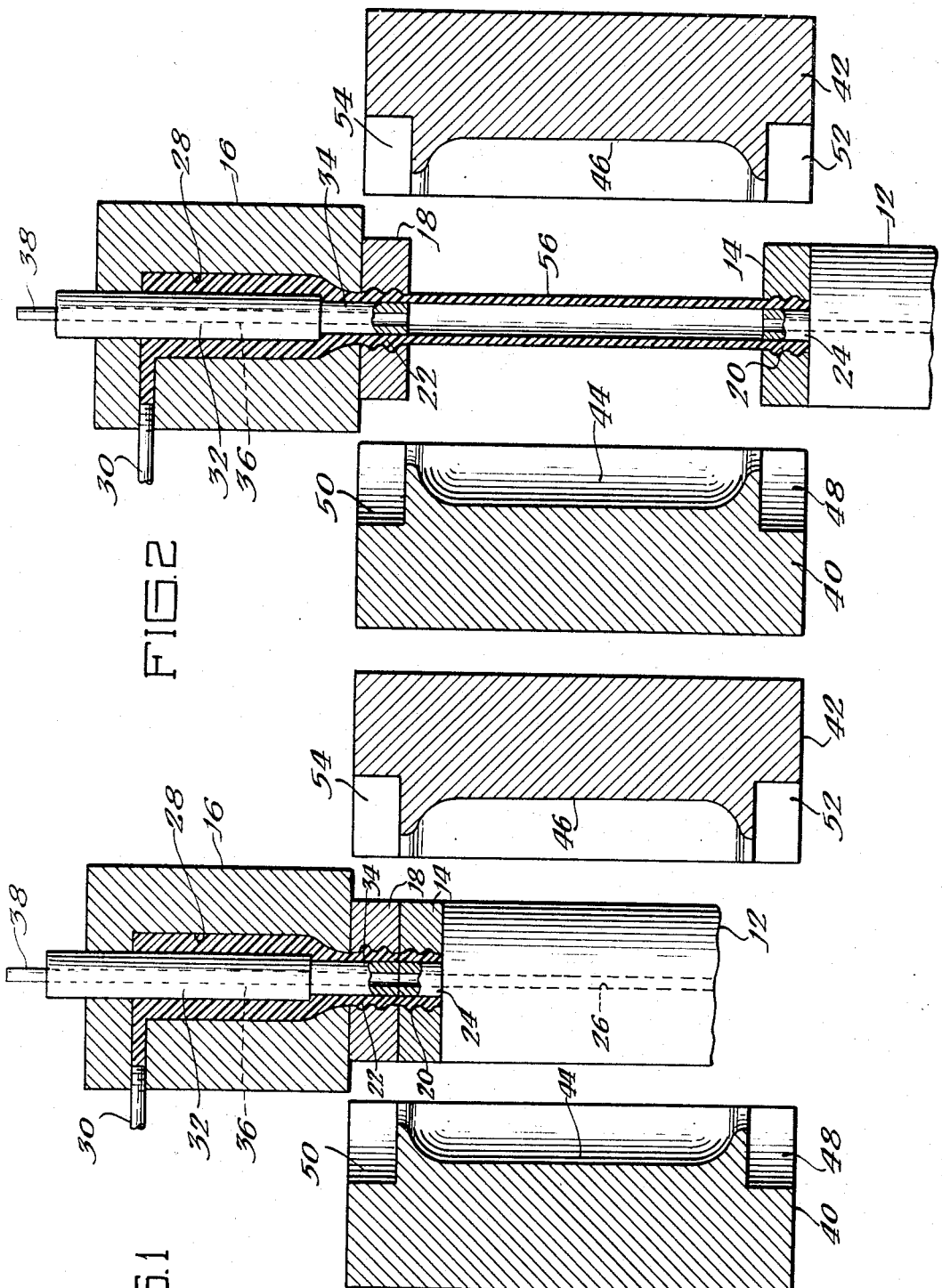

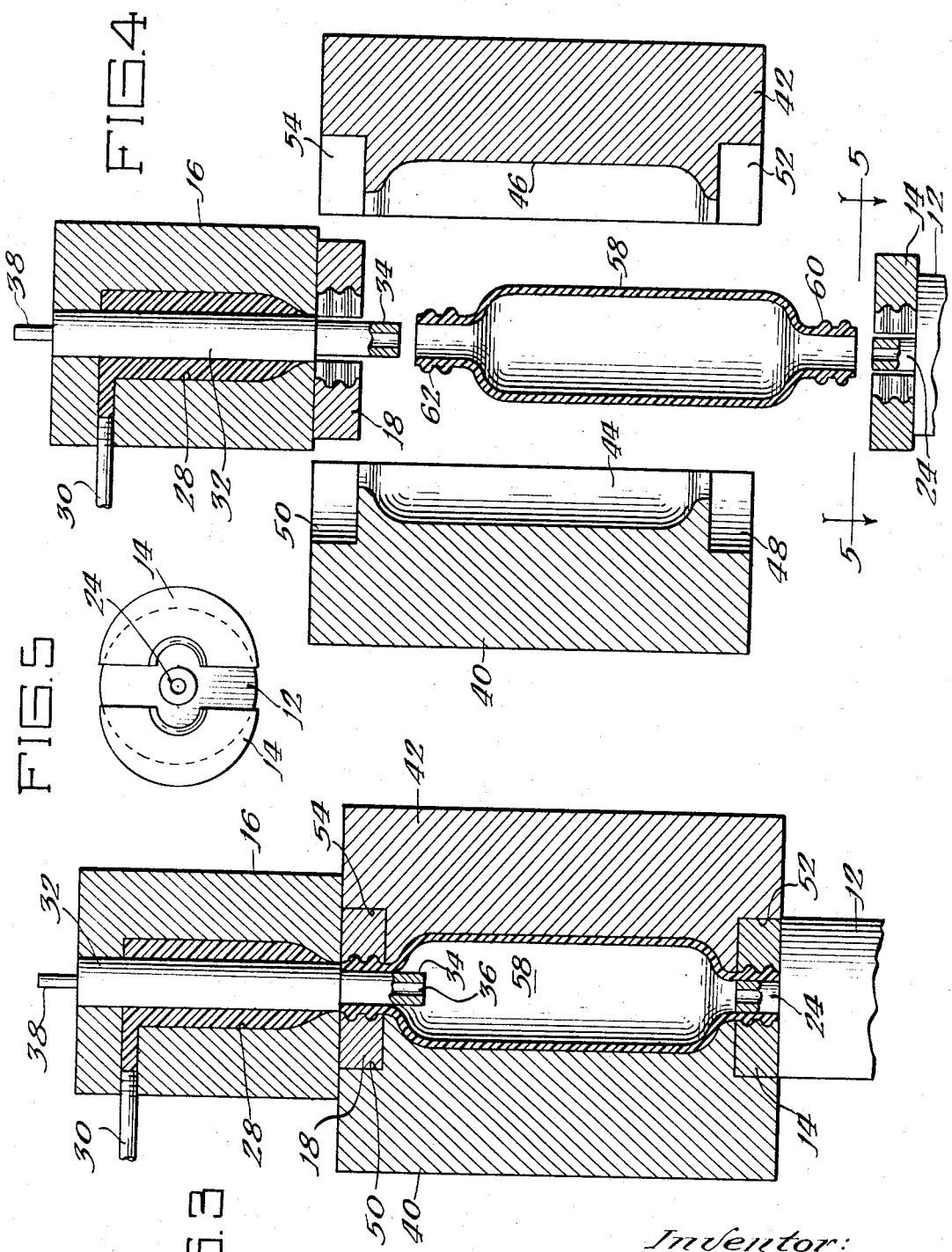

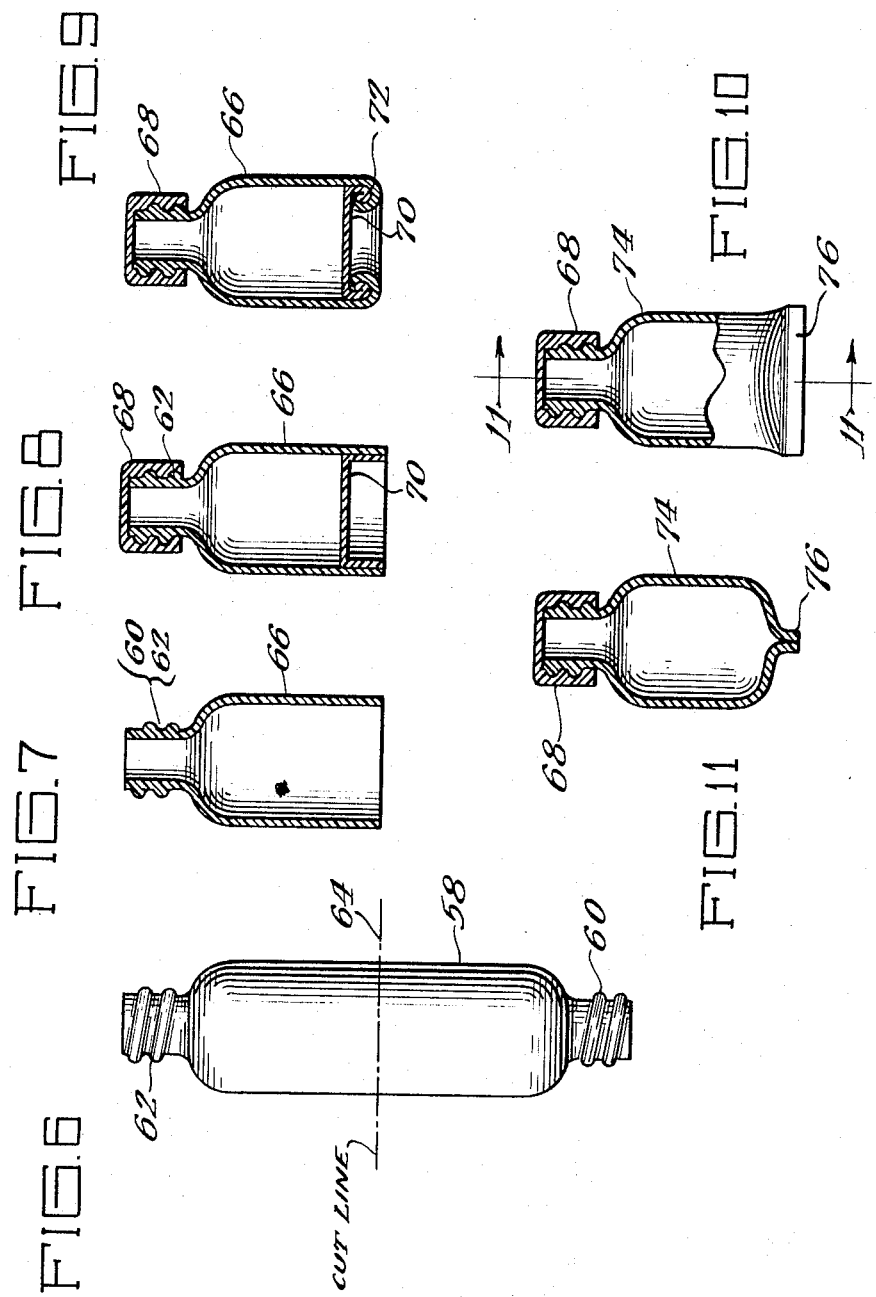

3,328,498
METHOD FOR FABRICATING BOTTLE SHAPED CONTAINERS
Grant W. Cheney, Midland, Mich., assignor to The Dow Chemical Company, Midland, Mich., a corporation of Delaware
Continuation of application Ser. No. 34,020, June 6, 1960. This application May 13, 1964, Ser. No. 369,350
8 Claims. (Cl. 264—97)

This application is a continuation of application Ser. No. 34,020 filed on June 6, 1960.

This invention relates to an improvement for molding hollow items, and more particularly to a method whereby a blow molded plastic bottle blank is produced, which blank may be utilized for making, filling and sealing two bottles in subsequent operations.

In my copending application, Ser. No. 27,775 filed on May 9, 1960, an improved method for blow molding two complete plastic bottles in a single split type die is disclosed. The present invention utilizes certain principles of the method set forth in the copending application; however, the present invention may be utilized to provide a blank, or bottle preform, from which two bottles may be made, filled, and sealed in subsequent operations.

The utilization of bottle-like plastic containers of the prior art for carrying certain dry household products such as cleansers, usually require filling through a narrow bottleneck, which filling process is slow. The bottle-like containers made according to the principles of the present invention, feature an open bottom by which the bottle can be rapidly filled with the product, closed with a bottom insert, and sealed, in a rapid and efficient manner. In addition, the bottles formed according to the method of the invention are characterized by having good dimensional tolerance, and require very little, if any, finishing operations after removal from the molding die.

The main object of this invention is to provide a method for blow molding thermoplastic bottles which may be filled with a product and sealed all in a rapid and efficient manner.

A more specific object of the invention is to provide a method for blow molding a thermoplastic bottle blank in a single die, which blank may be used for forming two bottles which are subsequently filled and sealed.

Other objects of the invention are to provide a method for the production of thermoplastic bottles which display good dimensional tolerance, and which require a minimum of finishing operations.

These and further objects and features of the invention will become more apparent from the following description and accompanying drawings wherein:

FIG. 1 is a schematic illustration showing in cross-section the relative position of various parts of molding apparatus which may be used to practice the method of the invention, and showing said parts during the initial phase of bottle molding operations, mainly, wherein two bottle neck portions are being molded;

FIG. 2 is the same but showing the drawing of a plastic tube formed integral with the bottle neck portion;

FIG. 3 is the same but showing the position of various parts during the blowing of the tube into engagement with the cavity of a split type of molding die to form a dual bottle blank;

FIG. 4 is the same but showing the position of the various parts during removal of the blown bottle blank from the die;

FIG. 5 is a section view generally as seen along the line 5—5 in FIG. 4;

FIG. 6 is an exterior elevation view of a bottle blank as removed from the molding apparatus of FIGS. 1 to 5;

FIG. 7 is a section view of an incomplete bottle as obtained by severing the bottle blank of FIG. 6 into two equal portions;

FIG. 8 is the same as FIG. 7, but showing the bottle portion after being filled with a product and closed with a bottom insert;

FIG. 9 is the same as FIG. 8, but showing the bottom edge of the bottle, as well as the bottom insert, rolled for sealing;

FIG. 10 illustrates a bottle portion, such as shown in FIG. 7, but showing a different method for sealing the bottom of the bottle; and FIG. 11 is a section view generally as seen along a line 11—11 in FIG. 10.

Referring now to the drawings and more particularly to FIG. 1, the numeral 12 identifies a reciprocable plunger, or shaft, which supports at its upper end a split type, bottle neck portion molding die 14. Means (not shown) are provided to maintain the die 14 in closed position upon the plunger 12, and subsequently to open the die during bottle blank removing operation, as will be described hereinafter. An extruding head 16 is adapted to maintain upon its lower surface a split type, bottle neck molding die 18, which is similar to the die 14. Means (not shown) are provided for maintaining the die 18 in closed position, and for subsequently opening the die during bottle blank removing operation. The stroke of the plunger 12 is arranged so that in uppermost position the die 14 will be held in abutting relation with the die 18, as shown. The dies 14 and 18 are each formed with a hole having spiral grooves or serrations 20 and 22 respectively, adapted to provide a thread on a bottle neck portion formed therein. A mandrel 24, projecting upwardly from the plunger 12 a distance equal to the thickness of the die 14, is arranged centrally, or axially relative to the die opening containing groove 20. A passageway 26 extends axially through the plunger 12 and the mandrel 24, which passageway is adapted to conduct a pressurized fluid medium, such as compressed air, for bottle blowing purposes as will be seen hereinafter.

The extruding head 16 is formed to provide an inner recess, or cavity 28 which opens at the lower end of the extruding head 16, and is concentrically arranged relative to the threaded opening 22 of the die 18. A pipe, or tube means 30 is arranged to conduct molten plastic material into the extruding head cavity 28. A reciprocable mandrel assembly 32 is arranged in the extruding head 16, the lower end 34 of said mandrel assembly being of reduced diameter, with a portion thereof projecting beyond the lower surface of the extruding head, a distance equal to the thickness of the neck die 18, and being arranged in spaced relation to the spiral groove opening 22 therein. When the mandrel assembly 32 is in lowermost position (FIGS. 3 and 4), the larger diameter portion thereof will close the cavity opening and prevent flow of plastic material out of the extruding head cavity 28. The mandrel assembly 32 is formed to provide a passageway 36 axially arranged therein, which passageway is adapted to receive at its upper end a pipe, or tube 38 adapted to conduct a pressurized fluid medium, such as compressed air, to the mandrel assembly for bottle blowing purposes, as will be more clearly seen hereinafter.

A split type molding die, includes symmetrically arranged die halves 40 and 42 which are adapted for movement toward and away from each other. The die half 40 is formed to provide a semi-circular cavity 44, while the die half 42 is formed to provide a semi-circular cavity 46. The die half 40 is further arranged to provide a semi-circular cavity 48 at the lower end, and a semi-circular cavity 50 at the upper end, while the die half 42 is formed to provide a semi-circular cavity 52 at the lower end and a semi-circular cavity 54 at the upper end. When the die halves 40 and 42 are moved together, the die cavities 50 and 54 embrace the neck portion die 18, while the die cavities 48 and 52 embrace the neck portion of the die 14, as seen in FIG. 3.

The use of the above described apparatus for practicing the method of the invention will now be described. In initial stage of operation, the die halves 40 and 42 are spaced apart, and the plunger 12 is moved upwardly so that the bottle neck die 14 engages the bottom of the bottle neck die 18. Molten plastic material under pressure is then injected downwardly within the space defined by the spiral groove portions 22 and 20 and mandrel ends 34 and 24, to form the two bottle neck portions as illustrated in FIG. 1.

Next, the plunger 12 is drawn downwardly, while simultaneously, plastic material is forced through the bottle neck portion formed in the neck portion die 18, to form an elongated plastic tube 56, integral with the bottle neck portions in the neck portion dies 14 and 18, as shown in FIG. 2.

The die halves 40 and 42 are next moved toward engaging relationship whereby the neck portion dies 14 and 18 are embraced as hereinbefore described, and at the same time the mandrel assembly 32 is moved downwardly to cut off further flow of plastic material out of the cavity 28. A pressure fluid, such as compressed air, is then fed into the interior of the tube 56 via passageways 26 and 36 to expand the tube into engagement with the walls of the die cavities 44 and 46, as shown in FIG. 3.

The die halves 40 and 42, as well as the neck dies 14 and 18, are next moved apart to provide clearance for the formed bottle blank, and the plunger 12 is moved downwardly a distance so that the ends of the bottle blank clear the mandrels 24 and 34, whereupon the bottle blank may be removed from the molding dies as shown in FIG. 4.

The bottle blank 58, which has at each end a reduced diameter threaded neck portion 62 and 60, is then cut, or severed along a line 64 midway between the threaded neck portions 60 and 62, to form two single bottle blanks 66, as seen in FIG. 7. A cap or cover means 68 is next affixed to the threaded neck portion of a bottle blank, and the bottle blank is inverted and filled with a product in the desired amount through the open bottom. A bottom insert 70 is then arranged in the bottle bottom opening, which insert is fixed in position by heat sealing means, or by rolling the circumferential flange of the insert together with the bottom edge portion of the bottle, as shown in FIG. 9.

With certain type of products it may be desirable, or advantageous to seal the bottle bottom by pinching the opening together to form a bottle 74 as shown in FIGS. 10 and 11. If this modified form of bottle bottom sealing is desired, it may be accomplished by the use of heat, or by rolling pinched edges 76 of the bottle bottom to form a seam.

While a simple type of plastic flow control valve, or means, has been shown and described, it may be desirable to utilize a sleeve type of plastic control valve, such as is disclosed in my co-pending application supra. In addition, it may be desirable to form the molding dies so that the walls of the die cavities, as well as the neck portion dies, may be cooled, as is likewise set forth in my co-pending application supra.

No specific mention has been made of the type of plastic material usable in the practice of the method of the invention; however, it is to be understood that any organic material having the necessary degree of elasticity, and adapted to be used for blow molding plastic bottles, such as normally solid polyolefins, particularly polyethylene, polypropylene, co-polymers of ethylene and propylene and the like, polystyrene and similar alkenyl aromatic resins and rubber modified variations thereof, vinyl chloride polymers, nylon, and so forth may be satisfactory.

From the foregoing, it will be seen that application of the method of the invention will attain the objectives hereinbefore set forth.

The foregoing description has been given in detail without thought of limitation since the inventive principles involved are capable of assuming other forms without departing from the spirit of the invention or the scope of the following claims.

What is claimed is:

1. A method for the production of thermoplastic bottles comprising the steps of injecting molten plastic material into two adjoining cylindrical neck molding dies to form two discrete bottle necks, moving the first of said neck molding dies axially away from the second of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, and severing the blank at about its midsection into two single open-bottom bottles.

2. The method of claim 1 including an additional step which involves closing the bottom of each bottle in the region of its severed end.

3. A method for the production of thermoplastic bottles comprising the steps of injecting molten plastic material into two adjoining cylindrical neck molding dies to form two discrete bottle necks, moving the first of said neck molding dies axially away from the second of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, severing the blank at about its midsection to form two single open-bottom bottles, and closing the bottom of each bottle in the region of its severed end by inserting a bottle bottom insert and securing said insert about its periphery to the wall of said bottle.

4. A method for the production of thermoplastic bottles comprising the steps of injecting molten plastic material into two adjoining cylindrical neck molding dies to form two discrete bottle necks, moving the first of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, severing the blank at about its midsection to form two single open-bottom bottles, and closing each bottle by inserting a flanged bottle bottom insert into the open bottom of said bottle, and securing the insert at its periphery to the wall of the bottle by rolling the flange of said insert together with the bottom edge of said bottle inwardly.

5. A method for the production of product filled thermoplastic bottles comprising the steps of injecting molten plastic material into two adjoining cylindrical neck molding dies to form two discrete bottle necks, moving the first of said neck molding dies axially away from the second of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, severing the blank at about its midsection to form two single open-bottom bottles, filling each bottle with product, and closing the bottom of each bottle in the region of its severed end by inserting a bottle bottom insert and securing said insert about its periphery to the wall of said bottle.

6. A method for the production of product filled thermoplastic bottles comprising the steps of injecting molten plastic material into two adjoining cylindrical neck molding dies to form two discrete bottle necks, moving the first of said neck molding dies axially away from the second of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, severing the blank at about its midsection to form two single open-bottom bottles, filling each bottle with product, and closing each bottle by inserting a flanged bottle bottom insert into the open bottom of said bottle, and securing the insert at its periphery to the wall of the bottle by rolling the flange of said insert together with the bottom edge of said bottle inwardly.

7. A method for the production of thermoplastic bottles comprising the steps of injecting molten plastic material into two adjoining cylindrical neck molding dies to form two discrete bottle necks, moving the first of said neck molding dies axially away from the second of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, severing the blank at about its midsection to form two single open-bottom bottles, and closing the bottom of each bottle in the region of its severed end by pinching the bottom edges together, followed by heat sealing the pinched edges to form a seam.

8. A method for the production of product filled thermoplastic bottles comprising the steps of injecting molten plastic material into two adjoining cylindrical neck molding dies to form two discrete bottle necks, moving the first of said neck molding dies axially away from the second of said neck molding dies while simultaneously extruding additional plastic material through one of said neck molding dies to form a tubular member extending between said necks and integral therewith, moving a split type molding die about said tubular member, admitting compressed air into the interior of said tubular member to expand it into contact with the walls of the cavity of said split type molding die to form a dual bottle blank for making two bottles, removing the blank from the neck molding dies and the molding die cavity, severing the blank at about its midsection to form two single open-bottom bottles, filling each bottle with product, and closing the bottom of each bottle in the region of its severed end, by pinching the bottom edges together, followed by heat sealing the pinched edges to form a seam.

References Cited

UNITED STATES PATENTS

| | | | |
|---|---|---|---|
| 2,503,171 | 4/1950 | Posner | 264—159 |
| 2,657,431 | 11/1953 | Slaughter | 264—99 |
| 2,678,471 | 5/1954 | Barton. | |
| 2,861,295 | 11/1958 | Hagen et al. | 18—5 |

FOREIGN PATENTS 1,171,388   1/1959   France.

OTHER REFERENCES

Applicant's U. S. patent application Ser. No. 27,775 filed May 9, 1960.

ROBERT F. WHITE, *Primary Examiner.*

M. H. ROSEN, R. B. MOFFITT, *Assistant Examiners.*